Figure 1:
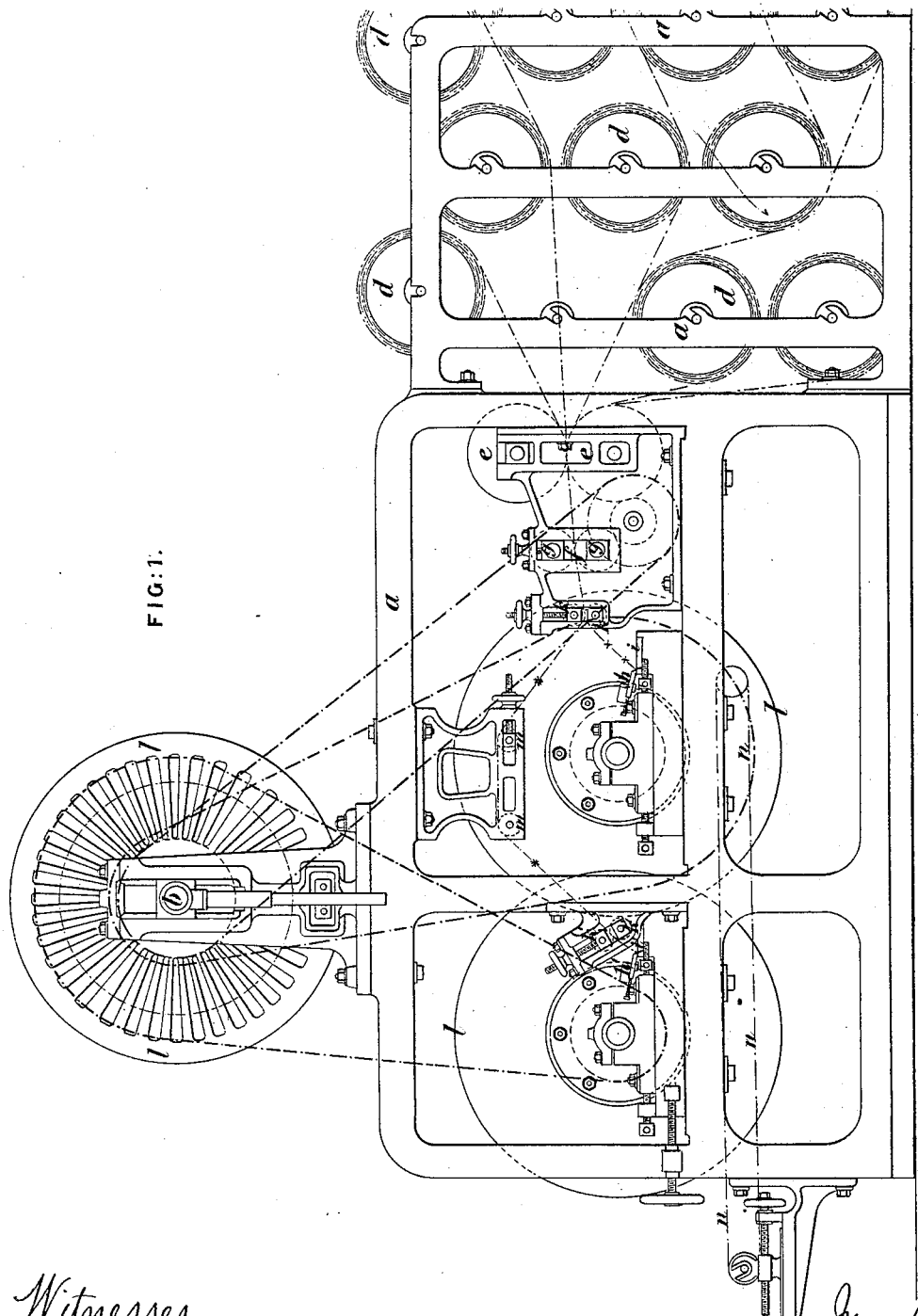

(No Model.) 2 Sheets—Sheet 1.

E. PARTINGTON.
MACHINE FOR CUTTING PAPER.

No. 247,400. Patented Sept. 20, 1881.

Witnesses
James F. Tobin
Harry Smith

Inventor
Edward Partington
by his Attorneys
Howson & Sons

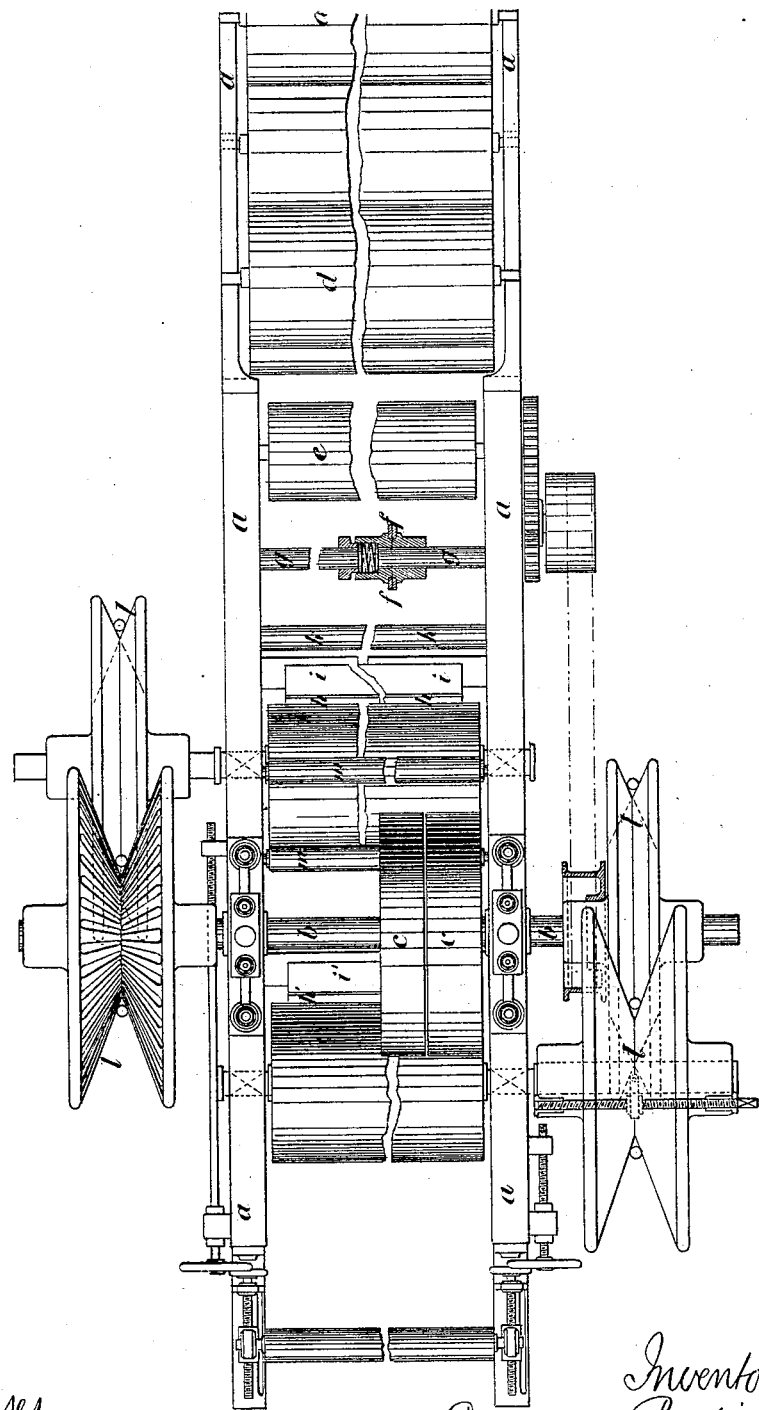

United States Patent Office.

EDWARD PARTINGTON, OF MANCHESTER, COUNTY OF LANCASTER, ENGLAND.

MACHINE FOR CUTTING PAPER.

SPECIFICATION forming part of Letters Patent No. 247,400, dated September 20, 1881.

Application filed June 29, 1881. (No model.) Patented in England May 20, 1878.

*To all whom it may concern:*

Be it known that I, EDWARD PARTINGTON, a subject of the Queen of Great Britain, and residing at Manchester, county of Lancaster, England, have invented Improvements in Machinery or Apparatus for Cutting Paper, (for which I have obtained a patent in Great Britain, No. 2,010, dated May 20, 1878,) of which the following is a specification.

This invention relates to apparatus employed for cutting continuous rolls of paper into sheets, the object of the invention being to afford facility for cutting sheets of different lengths and widths in the machine at one and the same time, whereby both time and material are economized.

The invention consists, principally, in the arrangement of several slitting-knives capable of adjustment for cutting the paper longitudinally to the various widths required, in combination with two revolving crosscut-knives for cutting the paper transversely. These two revolving crosscut-knives are each driven separately by means of expanding pulleys, so that their speed may be varied according to the length required, and the two may be driven at different speeds at one time. It will be seen that by means of this arrangement some of the sheets may be cut transversely and others longitudinally at the same time, so as to get the greatest number of sheets out of a certain width of paper with the minimum of waste. Suppose, for example, that the paper-making machine is eighty inches wide and it is required to cut sheets of thirty inches by fifteen inches, with the ordinary arrangement the deckles of the paper-making machine would have to be set to about sixty inches, or rather more, the slitting-knives to fifteen inches, and the crosscut-knife to thirty inches, whereas with my improved arrangement of machine, with two crosscut-knives, the paper-making machine could be worked up to nearly its full width—say seventy-five inches, or rather more—two of the slitting-knives would be set to cut thirty inches, and one to cut fifteen. One of the revolving crosscut-knives being then speeded to cut thirty inches and the other to cut fifteen, all that remains to be done is to convey the narrow (fifteen-inch) strip to the former and the wide (thirty-inch) strips to the latter, which is done by means of carrying-rollers placed between the slitting-knives and the crosscut-knives, and thus, by cutting two-thirds of the sheet crosswise of the paper and the other third lengthwise, a considerable economy of time and material is effected, and the waste reduced to a minimum. It will be evident that by adjusting the width apart of the slitting-knives and the relative speeds of the two revolving crosscut-knives accordingly, any other combination required may be obtained, so as to cut the paper to the greatest advantage. For instance, if it be required to cut paper sixty-eight inches wide into sheets eleven inches by eight, in the ordinary machine it would have to be cut into six strips of eleven inches, wasting two inches along the whole length; but by my improved arrangement it could be divided into seven strips—three of eight inches and four of eleven inches—and by setting one crosscut-knife to eleven inches and the other to eight inches no waste whatever would be made.

In the annexed drawings, which form part of this specification, Figure 1 represents a side elevation, and Fig. 2 a partial plan view, of a paper-cutting machine made and arranged according to my invention.

$a\ a$ represent the frame-work; $b\ b$, the main driving-shaft; $c\ c$, the fast and loose pulleys, and $d\ d$ the rolls of paper to be cut.

$e\ e$ are the drawing-in rollers for feeding the paper to the slitting-knives $f\ f$. It will, of course, be understood that although only one of these knives is shown at Fig. 2 in the drawings, there are in the actual machine a certain number of them fixed at suitable distances on the shafts $g\ g$, according to the required widths of the strips to be cut.

$h\ h'$ are the two revolving crosscut-knives, acting against fixed blades $i\ i'$. These two crosscut-knives, being of the same diameter, are driven at different speeds so as to cut different lengths of paper by means of expanding pulleys $l\ l$, which can be set to the width required.

The whole of the strips of paper as cut by the slitting-knives $f\ f$ pass between a pair of small rollers, $k\ k$. Those strips, * *, which are to be cut by the crosscut-knife $h$ are carried downward directly thereto, (see Fig. 1,) while those strips, * *, which are to be cut by the crosscut-knife $h'$, are carried over two guide-rollers, $m\ m$, and thence between a pair of small rollers, k″ k″, to the knife h′. The sheets are taken away as cut by means of the endless traveling cloth n n.

I claim as my invention—

1. The combination, in a paper-cutting machine, of adjustable knives for cutting the paper longitudinally, with two revolving crosscut-knives for cutting the paper transversely, and devices, substantially as described, for driving the said crosscut-knives separately from each other to vary their speed according to the length of paper required.

2. The combination, in a paper-cutting machine, of knives for cutting the paper longitudinally, with two revolving crosscut-knives and expanding pulleys for driving them, whereby their speed may be varied relatively to each other, as well as to that of the paper being cut, substantially as described.

3. The combination, in a paper-cutting machine, of knives for cutting the paper longitudinally, with two rotary crosscut-knives adapted to be driven at variable speeds and guide-rollers for separating the longitudinally-cut paper and directing one part to one crosscut-knife and the other to the other, all substantially as set forth.

In testimony whereof I have signed my name to this specification in the presence of two subscribing witnesses.

EDWARD PARTINGTON.

Witnesses:
CHARLES DAVIES,
JOHN HUGHES.